(12) United States Patent
Doan et al.

(10) Patent No.: US 11,215,175 B2
(45) Date of Patent: Jan. 4, 2022

(54) SYSTEMS AND METHODS FOR MAINTAINING POOL SYSTEMS

(71) Applicant: Poolside Tech, LLC, New Hope, PA (US)

(72) Inventors: William R. Doan, New Hope, PA (US); Stan Reznik, Riverwoods, IL (US); Calvin Irwin, Cambridge (CA)

(73) Assignee: Poolside Tech, LLC, New Hope, PA (US)

( * ) Notice: Subject to any disclaimer, the term of this patent is extended or adjusted under 35 U.S.C. 154(b) by 0 days.

(21) Appl. No.: 17/209,858

(22) Filed: Mar. 23, 2021

(65) Prior Publication Data

US 2021/0324846 A1 Oct. 21, 2021

Related U.S. Application Data

(60) Provisional application No. 63/011,470, filed on Apr. 17, 2020.

(51) Int. Cl.
*F04B 49/06* (2006.01)
*F04B 13/00* (2006.01)
(Continued)

(52) U.S. Cl.
CPC ......... *F04B 49/065* (2013.01); *E04H 4/1245* (2013.01); *F04B 13/00* (2013.01); *F04B 49/06* (2013.01); *F04B 49/20* (2013.01); *F04D 13/06* (2013.01); *F04D 15/0066* (2013.01); *F04D 15/0077* (2013.01); *F04D 15/0088* (2013.01); (Continued)

(58) Field of Classification Search
CPC .. F04D 15/0066; F04D 13/06; F04D 15/0088; F04D 15/0077; F04D 27/004; F04D 15/0209; F04D 29/708; F04D 15/02; F04D 15/0245; F04B 49/065; F04B 49/20; F04B 49/06; F04B 2203/0209; F04B 2205/09; E04H 4/1245; F16K 37/0041;
(Continued)

(56) References Cited

U.S. PATENT DOCUMENTS 3,819,297 A * 6/1974 East ................... F04D 15/0209
417/38
4,090,532 A 5/1978 Story
(Continued)

FOREIGN PATENT DOCUMENTS

WO 2021050932 A1 3/2021

OTHER PUBLICATIONS

International Search Report and Written Opinion, International Patent Application No. PCT/US2021/026563, dated Jun. 22, 2021.

*Primary Examiner* — Peter J Bertheaud
(74) *Attorney, Agent, or Firm* — Saul Ewing Arnstein & Lehr LLP; Brian R. Landry; Paul A. Leicht (57) ABSTRACT

One aspect of the invention provides a system including: a liquid filter configured for fluidic communication with a fluid repository; a flow sensor in fluidic communication with the liquid filter; a variable-speed pump in fluidic communication with the liquid filter and the flow sensor; and a processor in electronic communication with the flow sensor and the variable-speed pump. The processor is configured to: activate the flow pump at a specified flow rate; monitor a positioning of the flow sensor during the specified flow rate; and determine a performance status of the system from the flow sensor positioning.

14 Claims, 4 Drawing Sheets

(51) Int. Cl.

| | |
|---|---|
| *E04H 4/12* | (2006.01) |
| *F04D 29/70* | (2006.01) |
| *F04D 13/06* | (2006.01) |
| *F04D 15/00* | (2006.01) |
| *F04D 27/00* | (2006.01) |
| *F04D 15/02* | (2006.01) |
| *F04B 49/20* | (2006.01) |
| *F16K 37/00* | (2006.01) |
| *F16K 15/03* | (2006.01) |

(52) U.S. Cl.
CPC ......... *F04D 15/02* (2013.01); *F04D 15/0209* (2013.01); *F04D 15/0245* (2013.01); *F04D 27/004* (2013.01); *F04D 29/708* (2013.01); *F16K 37/005* (2013.01); *F16K 37/0033* (2013.01); *F16K 37/0041* (2013.01); *F04B 2203/0209* (2013.01); *F04B 2205/09* (2013.01); *F16K 15/03* (2013.01)

(58) Field of Classification Search
CPC .... F16K 15/03; F16K 37/0033; F16K 37/005; G01F 1/28; G01F 1/26
See application file for complete search history.

(56) References Cited

U.S. PATENT DOCUMENTS

| | | | |
|---|---|---|---|
| 4,322,297 A | 3/1982 | Bajka | |
| 5,483,227 A * | 1/1996 | Kuo | ........................ G01F 23/74 335/17 |
| 6,670,584 B1 | 12/2003 | Azizeh | |
| 7,931,447 B2 | 4/2011 | Levin et al. | |
| 8,131,497 B2 | 3/2012 | Steinberg et al. | |
| 8,313,305 B2 * | 11/2012 | Bevington | ............ F04B 49/002 417/20 |
| 8,800,473 B1 * | 8/2014 | DeVerse | ................... G01P 5/04 116/275 |
| 9,031,702 B2 | 5/2015 | Pruchniewski et al. | |
| 10,219,975 B2 | 3/2019 | Potucek et al. | |
| 2003/0163865 A1 | 9/2003 | Huang | |
| 2004/0230344 A1 | 11/2004 | Gallupe et al. | |
| 2005/0222786 A1 | 10/2005 | Tarpo et al. | |
| 2006/0272830 A1 | 12/2006 | Fima | |
| 2007/0154319 A1 | 7/2007 | Stiles et al. | |
| 2008/0078100 A1 | 4/2008 | Kim et al. | |
| 2008/0148592 A1 | 6/2008 | Kim et al. | |
| 2008/0313921 A1 | 12/2008 | Oh et al. | |
| 2008/0313923 A1 | 12/2008 | Oh et al. | |
| 2009/0139110 A1 | 6/2009 | Oh et al. | |
| 2009/0151801 A1 | 6/2009 | Gorman et al. | |
| 2009/0204263 A1 | 8/2009 | Love | |
| 2011/0315262 A1 | 12/2011 | Butler et al. | |
| 2012/0073040 A1 * | 3/2012 | Cohen | ................... E04H 4/1272 4/504 |
| 2012/0123594 A1 | 5/2012 | Finch et al. | |
| 2013/0327403 A1 | 12/2013 | Jensen | |
| 2014/0305525 A1 | 10/2014 | Le Moing et al. | |
| 2015/0107675 A1 | 4/2015 | Kucera | |
| 2015/0278930 A1 | 10/2015 | Potucek et al. | |
| 2016/0153456 A1 | 6/2016 | Stiles et al. | |
| 2017/0209338 A1 | 7/2017 | Potucek et al. | |
| 2018/0240322 A1 | 8/2018 | Potucek et al. | |
| 2019/0204203 A1 | 7/2019 | Nix | |
| 2019/0331363 A1 | 10/2019 | Peng et al. | |
| 2020/0319621 A1 | 10/2020 | Roy et al. | |
| 2021/0047853 A1 | 2/2021 | Gamboa et al. | |

* cited by examiner

SYSTEMS AND METHODS FOR MAINTAINING POOL SYSTEMS

CROSS-REFERENCE TO RELATED APPLICATION

This application claims the benefit of priority under 35 U.S.C. § 119(e) to U.S. Provisional Patent Application Ser. No. 63/011,470, filed Apr. 17, 2020. The entire content of this application is hereby incorporated by reference herein.

BACKGROUND OF THE INVENTION

Pool systems (e.g., swimming pools, hot tubs, spas, and the like) typically include maintenance systems for cleaning the pool water, such as a liquid filtration system, debris traps, and the like. Over time, these maintenance systems can become clogged or degrade.

SUMMARY OF THE INVENTION

One aspect of the invention provides a system including: a liquid filter configured for fluidic communication with a fluid repository; a flow sensor in fluidic communication with the liquid filter; a variable-speed pump in fluidic communication with the liquid filter and the flow sensor; and a processor in electronic communication with the flow sensor and the variable-speed pump. The processor is configured to: activate the flow pump at a specified flow rate; monitor a positioning of the flow sensor during the specified flow rate; and determine a performance status of the system from the flow sensor positioning.

This aspect of the invention can have a variety of embodiments. The processor can be further configured to identify the flow sensor is in a closed positioning during the monitoring. The status can be an underperforming status. The specified flow rate can meet or falls below an underperforming status threshold. The processor can be further configured to activate a calibration procedure, wherein the calibration procedure comprises: activating the variable-speed pump at a plurality of specified calibration flow rates and in a descending order; determining a specified calibration flow rate when the flow sensor is in a closed position; and identifying the underperforming status threshold from the specified calibration flow rate.

The processor can be further configured to identify that the flow sensor is in an open position during the monitoring. The status can be an adequately performing status. The specified flow rate can meet or exceed an underperforming status threshold.

The processor can be further configured to activate the variable-speed pump at a plurality of specified flow rates, wherein the specified flow rate is one of the plurality of specified flow rates. The processor can be further configured to activate the variable-speed pump for at least a subset of specified flow rates of the plurality of specified flow rates in an order of descending flow rate values, wherein the monitoring occurs for each of the subset of specified flow rates.

The flow sensor can include a paddle flow switch.

The system can be selected from a group consisting of pool and spa maintenance system.

The processor can be further configured to transmit a system status alert corresponding to the status of the system. The system status alert can be transmitted to an entity selected from a group consisting: of a user and a maintenance professional.

The performance status can be indicative of a performance status of the liquid filter.

The system can further include a subsystem including at least a valve configured for fluidic communication with another fluid repository, the liquid filter, the flow sensor, and the variable-speed pump, wherein the processor is further configured to: actuate the valve to fluidically connect the other fluid repository to the variable-speed pump; activate the flow pump at another specified flow rate; monitor the positioning of the flow sensor during the other specified flow rate; and determine a performance status of the subsystem from the flow sensor positioning. The processor can be further configured to: compare the performance status of the subsystem with the performance status of the system; and identify a performance issue from the comparison.

The system can further include: a subsystem including: another liquid filter configured for fluidic communication with the fluid repository; another flow sensor in fluidic communication with the other liquid filter; and another variable-speed pump in fluidic communication with the other liquid filter and the other flow sensor wherein the processor is further configured to: activate the other flow pump at another specified flow rate; monitor a positioning of the other flow sensor during the other specified flow rate; and determine a performance status of the subsystem from the other flow sensor positioning. The processor can be further configured to: compare the performance status of the subsystem to the performance status of the system; and adjust a flow rate for the variable-speed pump, the other variable-speed pump, or both, from the comparison.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views.

DEFINITIONS

The instant invention is most clearly understood with reference to the following definitions.

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used in the specification and claims, the terms "comprises," "comprising," "containing," "having," and the like can have the meaning ascribed to them in U.S. patent law and can mean "includes," "including," and the like.

Unless specifically stated or obvious from context, the term "or," as used herein, is understood to be inclusive.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

DETAILED DESCRIPTION OF THE INVENTION

Pool Maintenance System

Methods and systems described herein relate to identifying performance issues for a pool maintenance system. A variable speed water pump and an in-line flow sensor can be integrated into a pool maintenance system. The pool system can be tested for normal operating pressure when liquid filter elements (e.g., a liquid filter, skimmers, and the like) of the maintenance system are known to be clean and free of obstruction. A variable-speed pump can be activated at full power until the in-line flow sensor can register a flow rate. Once the flow sensor activates, the pump can continue to run at full speed for a short period of time to ensure flow is registered consistently. Pump speed can then be reduced incrementally. Again, the pump can run for a short period of time during which the flow sensor is monitored to see if the sensor is still registering flow. This cycle can repeat with pump output being reduced in each iteration until the flow sensor can no longer register a flow rate. This condition can be achieved at pump power output greater than zero. The percentage at which flow stops registering can be saved (e.g., through dedicated memory). This value can be referred to as a clean system flow threshold.

Over time, dirt and debris (e.g., leaves, sticks, and the like) can accumulate in filters, skimmer baskets, drain covers, pool pump baskets, etc. When this occurs, the obstruction in flow can cause the flow sensor to stop registering flow at higher pump output levels than the previously recorded clean system flow threshold. This value can be recorded as a current system flow threshold. The maintenance system can identify the specified flow rate of the pump and the difference between power output of the clean system flow threshold and current system flow threshold. Based on this difference, the maintenance system can determine if filter elements must be serviced.

Variable-Speed Pump

Figure 1:
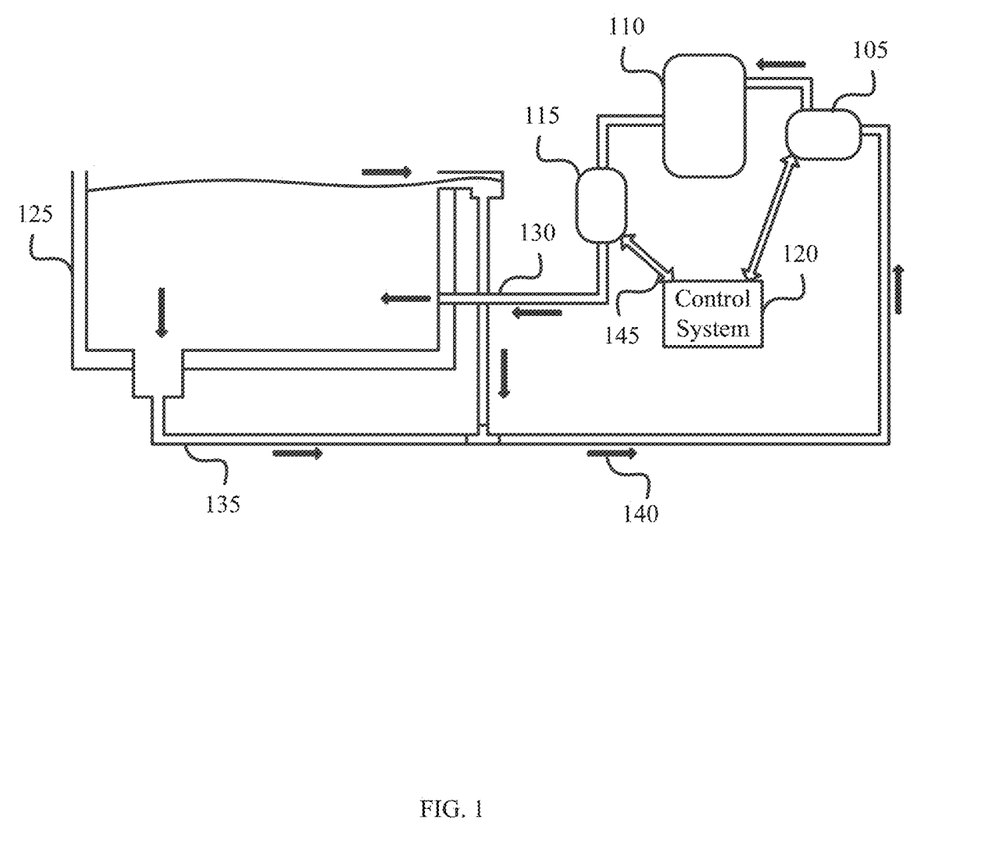
FIG. 1 depicts a maintenance system for a fluid repository according to embodiments of the claimed invention.

An exemplary embodiment of the maintenance system is depicted in FIG. 1. The maintenance system can include a variable-speed pump 105. The pump 105, when activated, can flow water or other fluid through the maintenance system. Further, the pump 105 can be activated at variable flow rates. For example, a controller or control system can manage the rotations per minute (rpm) of a speed pump fan, which can be directly correlated to the power output of the pump. Additionally, as the pump 105 can include a maximum rpm or power output, a controller or control system can activate the pump 105 at rpm and/or power fractions of the pump's maximum output. Examples of variable-speed pumps can include, but are not limited to, HAYWARD ECOSTAR, HAYWARD TRISTAR, JANDY EPUMP, PENTAIR INTELLIFLO VS, and the like.

Flow Rate Sensor

The maintenance system can also include a flow rate sensor 115. The flow rate sensor 115 can be in fluidic communication with the variable-speed pump 105, for example via a fluid channel such as piping. The flow rate sensor 115 can receive flow rate measurement signals of a fluid flowing to the flow rate sensor 115. In some cases, the flow rate sensor 115 can be "downstream" of the variable-speed pump 105, such that fluid flowing from the variable-speed pump can flow towards the flow rate sensor 115.

In some cases, the flow rate sensor 115 can include a minimal flow rate registration threshold. For example, the flow rate sensor 115 can include a flow switch. The flow switch can include a paddle positioned within the fluid channel. When the flow rate sensor experiences a sufficient flow rate of the flowing fluid, the paddle is "pushed" or deflected by the flowing fluid. An electronic circuit can be completed (e.g., closed) when the paddle is in the pushed or deflected position, and can be open otherwise. The closed circuit can transmit an electrical communication to a controller or control system, such that the controller or control system can determine when a fluid flow rate exceeds the flow rate sensor's minimal flow rate registration threshold. Likewise, the controller or control system can determine when the fluid flow rate falls below the minimal flow rate registration threshold, as the controller or control system can determine that the system has not received an electrical communication from the flow rate sensor. In some cases, the flow rate sensor can be in electronic communication with another controller subsystem, such as a salt cell system. In these cases, the salt cell system can be in electronic communication with the control system of the maintenance system, and can act as a relay for communications between the flow rate sensor and the control system. Examples of flow rate sensors can include, but are not limited to, HAYWARD GLX-FLO-RP, HAYWARD AQUARITE, PENTAIR ITELLICHLOR, JANDY AQUAPURE, and the like Fluid Filter The maintenance system can also include a fluid filter 110. The fluid filter 110 can filter particles, debris, and the like from a fluid flowing through the maintenance system. Further, the fluid filter 110 can be in fluidic communication with the pump 105 and the flow rate sensor 115. As the fluid filter 110 traps or collects particles and other objects from the flowing fluid, the performance of the fluid filter 110 can degrade over time. Examples of fluid filters of the maintenance system can include, but are not limited to, HAYWARD PRO SERIES, HAYWARD SWIMCLEAR, JANDY PRO SERIES CV, JANDY CL CARTRIDGE FILTER, PENTAIR CLEAN and CLEAR PLUS, PENTAIR EASY CLEAN, and the like.

Control System

Figure 2:
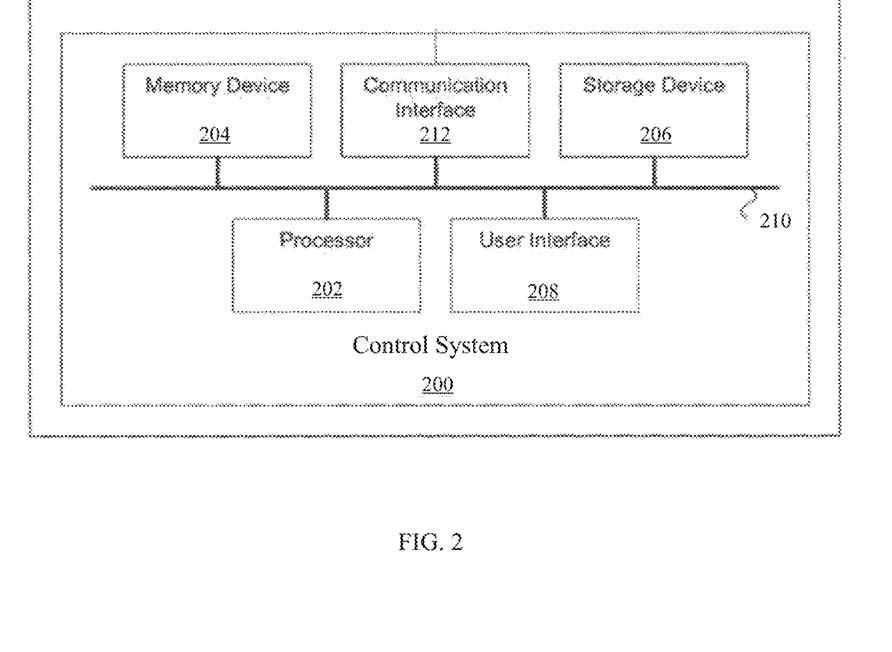
FIG. 2 depicts a control system according to embodiments of the claimed invention.

The maintenance system can also include a control system 120. For example, a control system 200 is depicted in FIG. 2. The control system 120 can be in electronic communication with the variable-speed pump 105 and the flow rate sensor 115. In some cases, the control system 120 can transmit activation communications to the variable-speed pump 105, such as a percentage of maximum power output or rpms for the pump to operate under. Further, the control system 120 can in some cases receive notification communications from the pump 105, the flow rate sensor 115, or both. For example, the pump 105 can transmit communications notifying the control system 120 of the pump 105 activating at a given power output or rpm. The flow rate sensor 115 can transmit flow rate communications to the control system 120, such as when the flow rate sensor 115 is in a deflected or pushed position.

Referring to FIG. 2, the control system 200 can be an electronic device programmed to control the operation of the maintenance system to achieve a desired result. The control system 200 can be programmed to autonomously carry out a system performance status regimen without the need for input (either from feedback devices or users) or can incorporate such inputs. The principles of how to use feedback (e.g., from a flow rate sensor) in order to modulate operation of a component are described, for example, in Karl Johan Astrom & Richard M. Murray, *Feedback Systems: An Introduction for Scientists & Engineers* (2008).

The control system 200 can be a computing device such as a microcontroller (e.g., available under the ARDUINO® OR IOIO™ trademarks), general purpose computer (e.g., a personal computer or PC), workstation, mainframe computer system, and so forth. The control system ("control unit") 200 can include a processor device (e.g., a central processing unit or "CPU") 202, a memory device 204, a storage device 206, a user interface 208, a system bus 210, and a communication interface 212.

The processor 202 can be any type of processing device for carrying out instructions, processing data, and so forth.

The memory device 204 can be any type of memory device including any one or more of random access memory ("RAM"), read-only memory ("ROM"), Flash memory, Electrically Erasable Programmable Read Only Memory ("EEPROM"), and so forth.

The storage device 206 can be any data storage device for reading/writing from/to any removable and/or integrated optical, magnetic, and/or optical-magneto storage medium, and the like (e.g., a hard disk, a compact disc-read-only memory "CD-ROM", CD-ReWritable CDRW," Digital Versatile Disc-ROM "DVD-ROM", DVD-RW, and so forth). The storage device 206 can also include a controller/interface for connecting to the system bus 210. Thus, the memory device 204 and the storage device 206 are suitable for storing data as well as instructions for programmed processes for execution on the processor 202.

The user interface 208 can include a touch screen, control panel, keyboard, keypad, display or any other type of interface, which can be connected to the system bus 210 through a corresponding input/output device interface/adapter.

The communication interface 212 can be adapted and configured to communicate with any type of external device, or with other components of the pool maintenance system. For example, double-lined arrows, such as the arrow 145, can illustrate electronic communication between the control system 120 of FIG. 1 and another component of the pool maintenance system (e.g., the variable-speed pump 105). The communication interface 212 can further be adapted and configured to communicate with any system or network, such as one or more computing devices on a local area network ("LAN"), wide area network ("WAN"), the Internet, and so forth. The communication interface 212 can be connected directly to the system bus 210 or can be connected through a suitable interface.

The control system 200 can, thus, provide for executing processes, by itself and/or in cooperation with one or more additional devices, that can include algorithms for controlling components of the pool maintenance system in accordance with the claimed invention. The control system 200 can be programmed or instructed to perform these processes according to any communication protocol and/or programming language on any platform. Thus, the processes can be embodied in data as well as instructions stored in the memory device 204 and/or storage device 206, or received at the user interface 208 and/or communication interface 212 for execution on the processor 202.

Pool Basin

The maintenance system can be coupled to a liquid repository 125, such as a pool basin, a spa basin, a hot tub basin, and the like. The coupling can be via fluidic channels, such as water piping and the like. Further, the dimensions and geometrical shapes of a coupled basin can vary, and one skilled in the art would understand different basin configurations can be coupled to the maintenance system.

In some cases, the maintenance system can be configured to couple to the fluid repository 125 via intake and outtake channels. For example, fluid channels can couple the fluid repository 125 to the fluid filter 110, and fluid channels can couple the fluid repository to the flow rate sensor 115 and/or the variable-speed pump 105. In some cases, the maintenance system can be fluidically coupled to the fluid repository in a recycling configuration, such that fluid is recycled from the fluid repository, through the maintenance system, and back to the fluid repository (e.g., with fluid flow direction depicted with arrows 140).

Performance Determination

The control system 120 can facilitate the execution of a performance determination procedure for the maintenance system. The control system 120 can instruct the variable-speed pump 105 to activate at a specified power or rpm output. In some cases, the variable-speed pump 105 can transmit an activation notification to the control system 120. The control system can then monitor the flow rate sensor 115 to determine the flow rate passing through the flow rate sensor 115. In the case of a flow rate switch, the control system 120 can monitor the switch to determine whether a flow rate is registered.

The control system 120 can activate the variable-speed pump 105 at a plurality of power outputs or rpms. For each activation, the control system 120 can monitor the flow rate sensor 115 for flow rate measurements and store flow rate measurements (or lack thereof), thereby executing a "cycle" of flow rate determination activations. The control system 120 can also determine a current system flow threshold from the activation cycle. For example, in the case of a flow switch, the current system flow threshold can be a power output or rpm value of the variable-speed pump 105 at which the switch registers a flow rate measurement (e.g., whereas an incrementally lower rpm value or power output results in no flow rate registration).

In some cases, the power output or rpm value of the variable-speed pump 105 can be adjusted incrementally. For example, the control system 120 can perform a cycle of activations in a descending value order (e.g., starting at 100% pump capacity, then 99% capacity, then 98% capacity, and so on). In other examples, the control system 120 can perform a cycle of activations in an ascending order value (e.g., 80% capacity, 85% capacity, 90% capacity, and so on). Other patterns of activations can occur in a cycle, and one skilled in the art would understand that the techniques described herein are not limited to the above cycle examples.

The control system 120 can also determine an optimal flow threshold for the maintenance system. The maintenance system can conduct an activation cycle similar to that described above. However, the maintenance system can determine that the maintenance is in an optimal or "clean" state. For example, the maintenance system can identify that the system has been recently cleaned (e.g., the fluid filter is cleaned or replaced, etc.). In some cases, the maintenance system can identify the optimal or clean state through user input (e.g., receiving a notice that the system has been cleaned).

Through the activation cycle, the control system 120 can determine a clean system flow threshold. In the case of a flow switch, the control system can determine the power output or rpm value the flow switch registers a flow rate measurement (e.g., whereas an incrementally lower output power or rpm value fails to register a flow rate measurement).

The maintenance system can then determine a performance status of the maintenance system. For example, the control system 120 can compare the current system flow threshold to the optimal flow threshold. Based on the difference, the control system 120 can determine the performance status of the maintenance system. For example, the difference between the current system flow threshold and the clean system flow threshold can be represented as a difference in power output or rpm values of the variable-speed pump 105. The control system 120 can determine whether this difference meets or exceeds a predefined performance status value, which can be dependent upon the optimal operating capacity of the variable-speed pump 105, the fluid filter 110, dimensions of a coupled fluid repository 125, and the like (e.g., the performance status threshold can equate to a 25% drop from optimal performance). If the difference meets or exceeds the performance status value, the control system 120 can determine that the maintenance system is operating under suboptimal performance conditions. Conversely, if the control system 120 determines the difference falls below the performance status value, the control system 120 can determine the maintenance system is operating under satisfactory or adequate performance conditions.

Conditions Affecting Maintenance System Performance

Over time, the maintenance system can degrade, become clogged, and the like, leading to suboptimal performance. These conditions can be taken into account when the maintenance system implements the activation cycles for the variable-speed pump 105. For example, the control system 120 can identify that the fluid filter 110 is clogged and requires maintenance through the difference value between the current system flow and optimal system flow thresholds. In some cases, the control system 120 can determine that a float trap or other debris capture subsystem of a coupled fluid repository 125 is clogged through the determined difference. In some cases, the control system 120 can compare difference values between different activation cycles to further identify the cause of the suboptimal performance. For example, if difference values vary greatly over cycles run over a short time gap, the control system 120 can identify that a debris capture subsystem has become clogged.

Performance Status Notification

In some cases, the control system 120 can transmit a performance status notification to a user. For example, if the control system 120 determines that the performance of the maintenance system is suboptimal, the control system 120 can transmit a notification relaying this information to a user, a maintenance professional, and the like. The notification can be sent wirelessly, for example, through a user application to a variety of personal computing devices or mobile phones. Likewise, the control system 120 can transmit a notification corresponding to an adequate performance state.

Multiple Fluid Repositories

Figure 3:
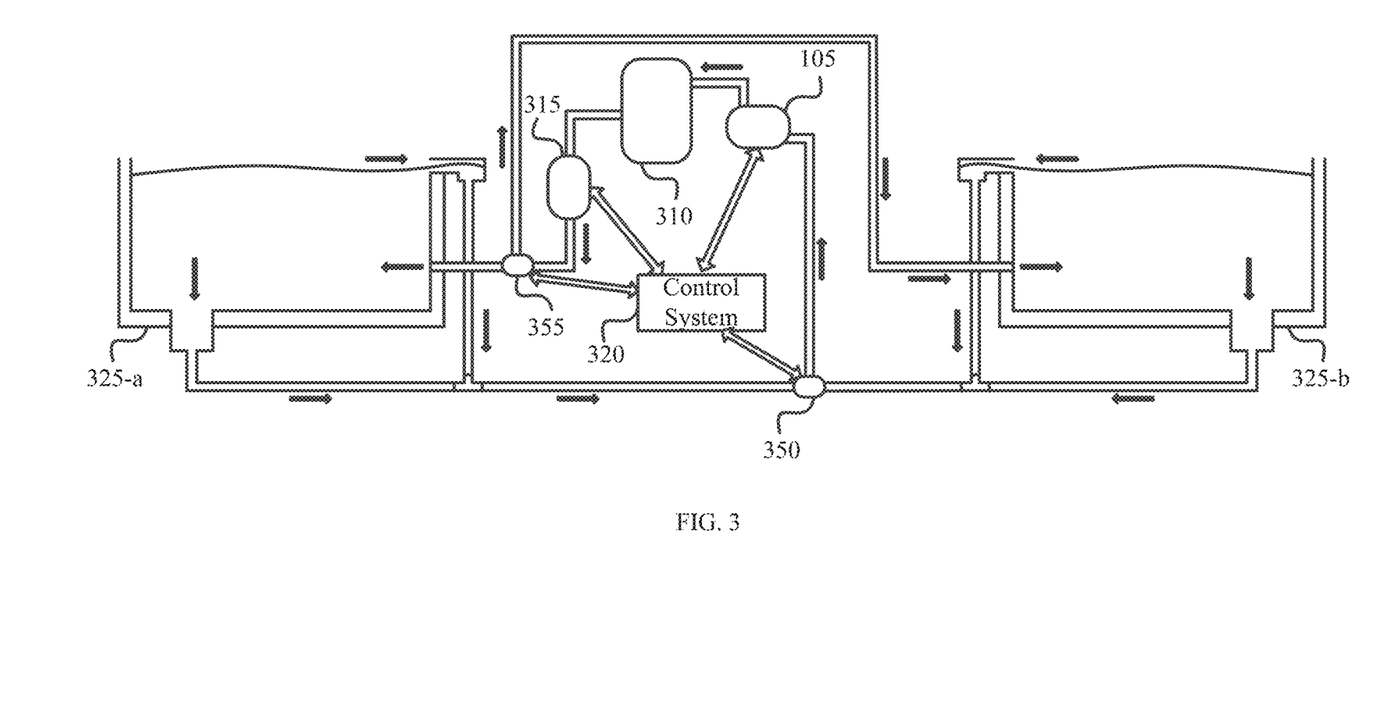
FIG. 3 depicts a maintenance system coupled to multiple fluid repositories according to an embodiment of the claimed invention.

In some cases, the maintenance system can be fluidically coupled to more than one fluid repository. An exemplary embodiment is depicted in FIG. 3. For example, the maintenance system can be coupled to a pool basin and a spa basin. The maintenance system can execute activation cycles separately for each of the coupled repositories 325-*a* and 325-*b*. For example, in some cases input fluid channels into each fluid repository can diverge from a single intake channel, and can be individually coupled or decoupled to fluid flow from the variable-speed pump 305 through a channel valve 355. Likewise, output fluid channels into each fluid repository can diverge from a single intake channel, and can be individually coupled or decoupled to fluid flow from the variable-speed pump 305 through a channel valve 350. The control system 320 can be in electronic communication with the channel valves 350 and 355, and can execute activation cycles separately for each of the fluid repositories.

In some cases, current system flows between the different fluid repositories can vary significantly (e.g., a difference of several output power or rpm values, etc.). In these cases, the control system 320 can determine that a performance condition apart from the fluid filter 310, the pump 305, and/or the flow rate sensor 315, and unique to one of the fluid repositories can be affecting the maintenance performance. For example, the control system 320 can determine a difference of several rpm values between a spa basin and a pool basin coupled to the maintenance system. The control system 320 can identify that the spa basin has the lower current system flow threshold, and further determine the spa basin includes a performance issue such as a clogged drain that is apart from the pool basin. The control system 320 can in some cases transmit a performance notification indicative of this performance issue of the spa basin.

Multiple Variable-Speed Pumps

Figure 4:
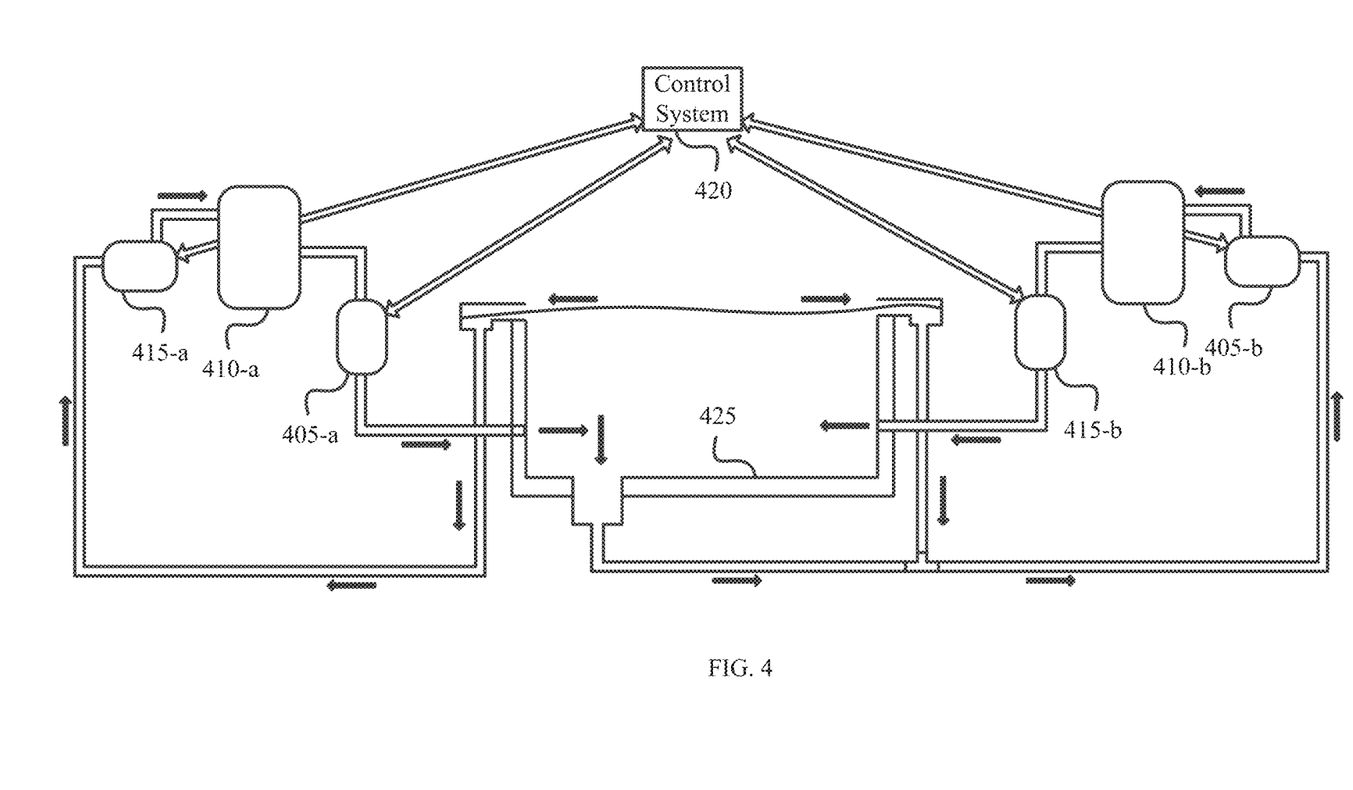
FIG. 4 depicts a maintenance system with multiple variable-speed pumps according to an embodiment of the claimed invention.

In some cases, the maintenance system can include multiple variable-speed pumps (e.g., as depicted in FIG. 4). Each pump 415-*a* and 415-*b* can be coupled to a fluid filter 410-*a* and 420-*b*, and flow rate sensors 405-*a* and 405-*b*, respectively, and can be configured to couple to a fluid repository 425. The control system 420 can execute activation cycles for each of the variable-speed pumps. Through the determined current system flow thresholds for each pump, the control system 420 can identify performance issues unique to a subset of the pumps. For example, the control system 420 can determine that pump 405-*b* has degraded (e.g., a mechanical or electrical component of the pump), or that fluidic channels unique to the pump 405-*b* are obstructed, or the like.

The maintenance system can alter the operation of the variable-speed pumps based on the determined performance statuses. For example, if the control system 420 determines that a variable-speed pump is performing sub-optimally compared to other speed pumps of the maintenance system, the control system 420 can instruct the sub-optimally performing pump to operate (e.g., during normal operation) under a lower power output or rpm value compared to other pumps.

Configurations

The maintenance system and techniques described herein, can be adaptable to the configurations of existing maintenance and fluid repository systems. For example, the control system can be configured to communicate with conventional variable-speed pumps, flow rate sensors, valves, fluid channels, and fluid repositories. Importantly, some maintenance systems can be retrofitted to execute the techniques described herein. For example, many conventional pool systems include a fluid filter, a variable-speed pump, a flow switch, and a pool basin. By implementing the techniques described herein, a maintenance system and effectively identify performance issues through a new approach, while utilizing hardware already installed for the maintenance system. This can significantly decrease costs for pool owners, for example, by eliminating the needs to expensive pressure sensors and reducing renovation costs, as well as provide the owner with current, accurate information on the status of the maintenance system.

Further, as shown in the figures and accompanying description, the system and techniques described herein can be adapted to a variety of pool, spa, or other fluid repository systems. While the FIGS. depict specific examples of configurations, one skilled in the art would understand that the maintenance system and associated techniques can be integrated into a multitude of fluid repository systems.

EQUIVALENTS

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications, and other references cited herein are hereby expressly incorporated herein in their entireties by reference.

The invention claimed is:

1. A system comprising:
    a liquid filter configured for fluidic communication with a fluid repository;
    a flow sensor in fluidic communication with the liquid filter;
    a variable-speed pump in fluidic communication with the liquid filter and the flow sensor; and
    a processor in electronic communication with the flow sensor and the variable-speed pump, the processor configured to:
        activate a calibration procedure comprising:
            activating the variable-speed pump at a plurality of specified calibration flow rates in a descending order;
            determining a specified calibration flow rate when the flow sensor is in a closed position; and
            identifying an underperforming-status threshold from the specified calibration flow rate;
        activate the variable-speed flow pump at a specified flow rate, wherein the specified flow rate meets or falls below the underperforming status threshold;
        monitor a positioning of the flow sensor during the specified flow rate;
        identify the flow sensor is in a closed positioning;
        determine an underperforming performance status of the system from the flow sensor positioning.

2. The system of claim 1, wherein the processor is further configured to identify that the flow sensor is in an open position during the monitoring, and wherein the status is an adequately performing status.

3. The system of claim 2, wherein the specified flow rate meets or exceeds an underperforming status threshold.

4. The system of claim 1, wherein the processor is further configured to activate the variable-speed pump at a plurality of specified flow rates, wherein the specified flow rate is one of the plurality of specified flow rates.

5. The system of claim 4, wherein the processor is further configured to activate the variable-speed pump for at least a subset of specified flow rates of the plurality of specified flow rates in an order of descending flow rate values, wherein the monitoring occurs for each of the subset of specified flow rates.

6. The system of claim 1, wherein the flow sensor comprises a paddle flow switch.

7. The system of claim 1, wherein the system is selected from a group consisting of pool and spa maintenance system.

8. The system of claim 1, wherein the processor is further configured to transmit a system status alert corresponding to the status of the system.

9. The system of claim 8, wherein the system status alert is transmitted to an entity selected from a group consisting: of a user and a maintenance professional.

10. The system of claim 1, wherein the performance status is indicative of a performance status of the liquid filter.

11. The system of claim 1, further comprising:
    a subsystem comprising at least a valve configured for fluidic communication with another fluid repository, the liquid filter, the flow sensor, and the variable-speed pump, wherein the processor is further configured to:
        actuate the valve to fluidically connect the other fluid repository to the variable-speed pump;
        activate the flow pump at another specified flow rate;
        monitor the positioning of the flow sensor during the other specified flow rate; and
        determine a performance status of the subsystem from the flow sensor positioning.

12. The system of claim 11, wherein the processor is further configured to:
    compare the performance status of the subsystem with the performance status of the system; and
    identify a performance issue from the comparison.

13. The system of claim 1, further comprising:
    a subsystem comprising:
        another liquid filter configured for fluidic communication with the fluid repository;
        another flow sensor in fluidic communication with the other liquid filter; and
        another variable-speed pump in fluidic communication with the other liquid filter and the other flow sensor
    wherein the processor is further configured to:
        activate the other flow pump at another specified flow rate;
        monitor a positioning of the other flow sensor during the other specified flow rate; and
        determine a performance status of the subsystem from the other flow sensor positioning.

14. The system of claim 13, wherein the processor is further configured to:
    compare the performance status of the subsystem to the performance status of the system; and
    adjust a flow rate for the variable-speed pump, the other variable-speed pump, or both, from the comparison.

* * * * *